US006213861B1

(12) United States Patent
Gunn

(10) Patent No.: US 6,213,861 B1
(45) Date of Patent: Apr. 10, 2001

(54) TONGUE AND GROOVE PANEL SIZING APPARATUS

(76) Inventor: Dalen Eugene Gunn, 3390 W. Hayden Ave., Rathdrum, ID (US) 83858

( * ) Notice: Subject to any disclaimer, the term of this patent is extended or adjusted under 35 U.S.C. 154(b) by 0 days.

(21) Appl. No.: 09/390,206

(22) Filed: Sep. 7, 1999

Related U.S. Application Data

(60) Provisional application No. 60/109,928, filed on Nov. 24, 1998.

(51) Int. Cl.[7] ........................................ B23F 21/03

(52) U.S. Cl. ........................................ 451/557; 451/523

(58) Field of Search ........................................ 451/557, 558, 451/522, 523, 524; 7/124, 158, 167, 169, 170

(56) References Cited

U.S. PATENT DOCUMENTS

| | | | |
|---|---|---|---|
| 769,191 | 9/1904 | Sipe et al. . | |
| 849,681 | 4/1907 | Hauver . | |
| 1,114,903 | 10/1914 | Moore . | |
| 1,148,552 | 8/1915 | Tingle . | |
| 1,195,297 | 8/1916 | Vlchek . | |
| 3,155,997 | 11/1964 | Gallagher . | |
| 3,310,826 | 3/1967 | Ellis . | |
| 3,820,185 | 6/1974 | Phillips . | |
| 4,930,177 | 6/1990 | Rastutis . | |
| 5,638,570 | 6/1997 | Gruner . | |
| 5,823,719 * | 10/1998 | Tyler | 407/29.15 |
| 5,997,221 * | 12/1999 | Sadler | 407/29.1 |

FOREIGN PATENT DOCUMENTS

| | | |
|---|---|---|
| PCT/EP97/02516 | 5/1997 | (WO) . |

* cited by examiner

*Primary Examiner*—Timothy V. Eley
*Assistant Examiner*—Dung Van Nguyen
(74) *Attorney, Agent, or Firm*—Gene Scott-Patent Law & Venture Group

(57) ABSTRACT

A hand tool is used for resizing bent, broken, warped or swollen tongue-in-groove panels, planks or boards. The tool has a cutter or file (rasp) mounted on one side so as to be inserted into a groove for cutting the groove to size. The other side of the tool has a pair of spaced apart cutting surfaces for smoothing a tongue. The tool is fastened by a simple clamp and has a handle for manipulation.

2 Claims, 2 Drawing Sheets

TONGUE AND GROOVE PANEL SIZING APPARATUS

This application claims the filing date of a previously filed provisional application having serial No. 60/109,928 and an assigned filing date of Nov. 24, 1998 and which contains subject matter substantially the same as that described and claimed in the present application.

BACKGROUND OF THE INVENTION

1. Field of the Invention

This invention relates generally to hand tools, and more particularly to a hand tool with features for sizing and resizing the tongue and groove features of construction panels and boards.

2. Description of Related Art

The following art defines the present state of this field:

Sipe et al., U.S. Pat. No. 769,191 provides in a channeling-took, a body, side flanges extending upward from the body, the side flanges provided with grooves upon their inner faces, the grooves being inclined downward and forward, a knife arranged within the grooves and extending between the side flanges, a screw extending transversely from one side flange to the other for binding the knife in place, the depth of the cut being regulated by the distance the knife protrudes from the lower and forward end of the body a horizontal adjustable guide carried by the body underneath the knife adapted to travel in contact with the edge of the leather and regulate the distance of the cut from the edge and a handle secured to the body and extending rearwardly therefrom.

Hauver, U.S. Pat. No. 849,681 describes a stock having a curved bearing-surface and with a transverse guideway near the bearing-surface, and operating-handle extending from the stock at one end, a head member adjustable disposed through the guideway and provided with transverse sockets, cutters adjustably disposed in said sockets with their operating ends extending in advance of the bearing-face of the stock, means for adjustably securing the head in the guideway and means for adjustably securing the cutters in the sockets.

Moore, U.S. Pat. No. 1,114,903 describes a reefing tool which comprises a handle with an integral head laterally extended and bifurcated at the extremity, and with a vertical blade adapted to enter and to be guided by a seam.

Tingle, U.S. Pat. No. 1,148,552 describes a tool or implement for stepping a tire casing in repairing blow-outs, comprising a shank provided with a guide member, and a cutter-blade connected with the guide member and extending below the same with the guide member extending upon opposite sides of the cutter-blade for substantial distances.

Gallagher, U.S. Pat. No. 3,155,997 describes a tool for raking out and smoothing mortar joints of masonry walls, a straight handle portion of flat relatively wide strap metal of rectangular cross section having one end of gooseneck shape terminating in a relatively narrow rake-out tongue with flared shoulders formed at an angle of about 45 degrees, the other end of the tool having a shank of the width of the rake-out tongue bent at substantially right angles to the handle portion in the same direction as the gooseneck end of the tool is bent and a trowel portion of approximately the width of the mortar joint integral with said shank extending from said shank at right angles substantially parallel to and spaced from the handle portion of the tool to dispose the handle at an angle to avoid contact of the hand with the wall.

Ellis, U.S. Pat. No. 3,310,826 describes a golfer's cleaning tool comprising an elongated blade member including a substantially flat central portion, a first end portion extending at an obtuse angle out of the plane of said central portion and terminating in a bifurcated shoe cleat cleaning extremity characterized by a substantially V-shaped opening between two relative blunt points, a second end portion extending arcuately from the plate of said central portion in a direction opposite to said first end portion and terminating in a relatively blunt point adapted for cleaning the junction between the sole and upper of a golfer's shoe, said second end portion having an opening therein adapted to receive a suspension device, and a pair of oppositely disposed reverted wing members each comprising a side portion extending in substantially perpendicular relation to an edge of said central portion, and an inwardly extending portion overlying said central portion and substantially parallel thereto, each inwardly extending portion terminating in a straight edge, said straight edges terminating in spaced opposed relation to each other to provide scraper blades adapted for the removal of mud from the golfer's shoes, said reverted wing portion extending from a longitudinal second portion, and terminating at a longitudinal point on said central portion spaced from said first end portion to provide auxiliary oppositely disposed scraping edges on the sides of said central body portion.

Vlchek, U.S. Pat. No. 1,195,297 describes a mortar joint scraper comprising a blade of plate material, scraper fingers projecting from the edges of the blade, and a handle supporting the blade whereby the blade takes a vertical position with relation to the face of a wall and the edges of the blade service as scrapers and guides.

Phillips, U.S. Pat. No. 3,820,185 describes a device for cleaning barbecue grills comprising a blade having a slot therein adapted to engage the grill rods. The blade is preferably twisted to facilitate pivoting the slot about the grill rods to clean the under surfaces thereof, and the blade may have two slots one an open slot at the tip thereof and one a closed slot set back from the tip, to enable cleaning of different sized grill rods. If the blade has two lots therein, the tip of the blade must be bent over just behind the scraping surface of the closed slot to permit engagement of the closed slot with the grill rods. In this case the closed slot is also preferably formed with an enlargement immediately behind the bend at the front of the slot, and the blade is preferably bent back near the opposite end of the closed slot.

Rastutis, U.S. Pat. No. 4,930,177 describes a scraping tool for removing paint residue from the friction seal of paint cans. The tool includes a handle of sufficient size to accommodate a human hand from which one of two scraping blades continue. Extending from the fore end of the tool is a rim scraping blade while conversely extending from the aft end is a lid scraping blade. The blades have contour edges shaped to approximate the cross sectional configuration of the rim and lid components of a paint can friction seal. The seal is cleaned completely, as the tool is designed to address both the rim and lid. Due to slightly smaller or larger blade dimensions, in respect to the seal configuration, the tool is allowed to move without encumbrance over the seal surface as it is cleaned. The blades are shaped to correspond specifically to the surfaces of the friction seal, permitting the tool to be used on assorted sizes of the cans as well as those of various manufacture.

Gruner, U.S. Pat. No. 5,638,570 describes a tool for scraping material from a bullnose installed on a corner joint of a drywall installation including an elongated device having a handle portion, a first end portion, a second end portion, and a size adapted for holding in one hand. The first end portion has a first convexly shaped edge that matches a concavely shaped portion of the bullnose. It enables a user to scrape the material from the bullnose by moving the convexly shaped edge along the concavely shaped portion of the bullnose. Preferably, the first concavely shaped edge is shaped in a 75-degree arc of 0.875 inch radius to match a convexly shaped portion of the bullnose when the bullnose is installed on a 90-degree corner joining, and the second end portion of the elongated device includes a second convexly shaped edge that is shaped in a 50-degree arc of 1.125 inch radius to match the concavely shaped portion of the bullnose when the bullnose is installed on a 135-degree corner joint. One embodiment takes the form of a 6.5 inch long aluminum bar having the specified shape.

Meier, PCT/EP97/02516 describes a tool for cleaning joints before they are filled with jointing compound, taking the form either of a plate-like handles or material-saving frames with at least one straight side from which projects a cleaning projection fitting into the joint to be cleaned, or as a handle section with interchangeable cleaning attachments.

The prior art teaches many hand tools for woodworking and construction. However, the prior art does not teach that such a hand tool may be constructed so as to advantageously resize tongue and groove features on planks and boards. The present invention fulfills these needs and provides further related advantages as described in the following summary.

SUMMARY OF THE INVENTION

The present invention teaches certain benefits in construction and use which give rise to the objectives described below.

A hand tool is used for resizing bent, broken, warped or swollen tongue-in-groove panels or planks or boards. The tool has a cutter or file (rasp) mounted on one side so as to be inserted into a groove for cutting the groove to size. The other side of the tool has a pair of spaced apart cutting surfaces for smoothing a tongue. The tool is fastened by a simple clamp and has a handle for manipulation.

A primary objective of the present invention is to provide a hand tool having advantages not taught by the prior art.

Another objective is to provide such a tool that is of simple and compact construction, is easily used and inexpensive to manufacture and assemble.

A further objective is to provide such a tool that is highly efficient in resizing tongue and groove features on planks and boards.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
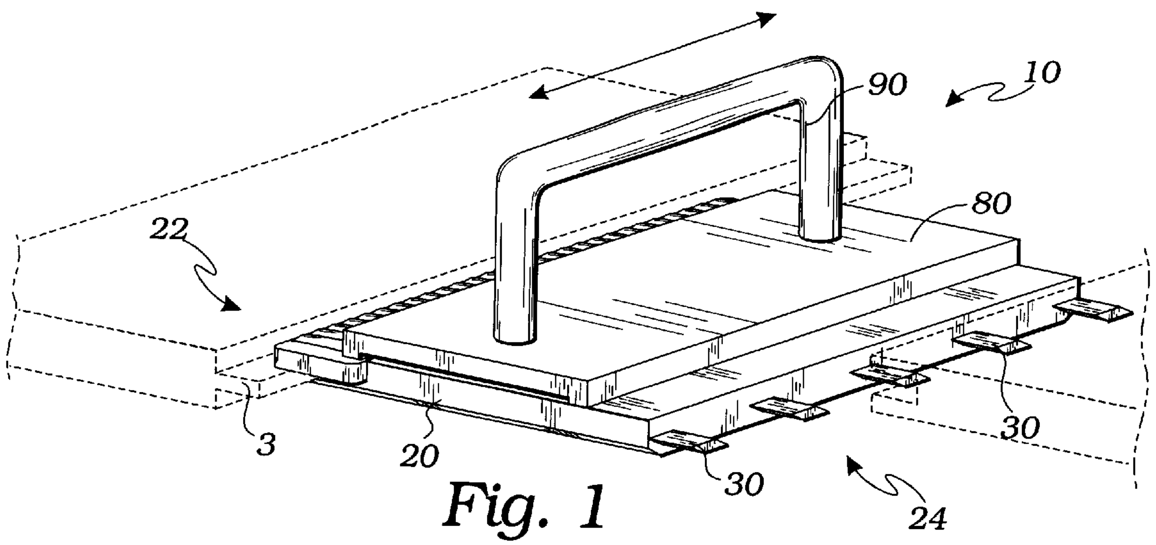
FIG. 1 is a perspective view of a first preferred embodiment of the present invention.
Figure 2:
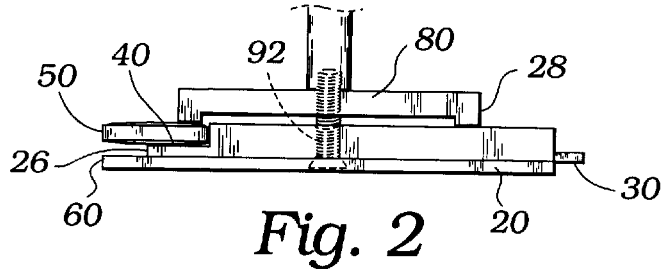
FIG. 2 is a partial end elevational view thereof.
Figure 3:
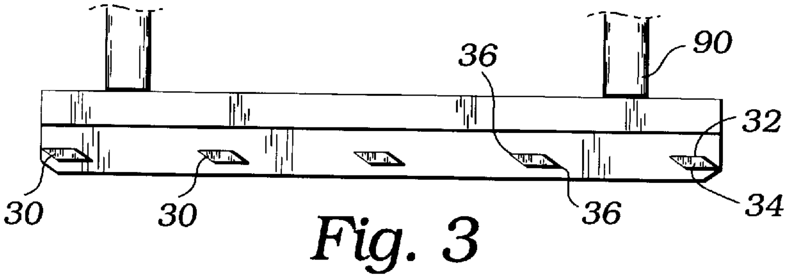
FIG. 3 is a partial right side elevational view thereof.
Figure 4:
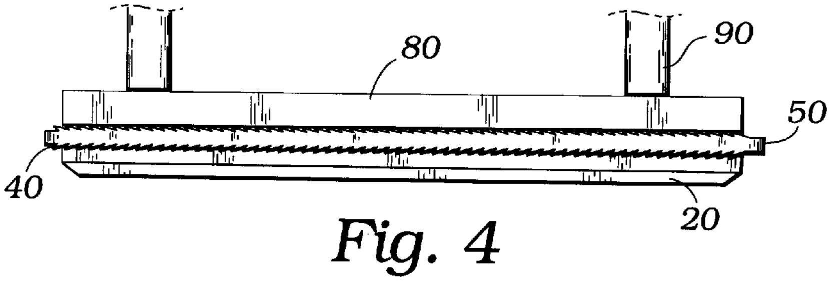
FIG. 4 is a partial left side elevational view thereof.

The above described drawing figures illustrate the invention, a hand tool apparatus for sizing and resizing tongue and groove panels and boards. In a first embodiment 10, shown in FIGS. 1–4, the apparatus comprises a tool body 20 providing a pair of opposing tool sides 22, 24, each of the tool sides including a tool side surface 26, 28. One of the tool side surfaces 28 has a plurality of integral and spaced apart knife blades 30 protruding therefrom, the knife blades 30 aligned in a row along the one said tool side surface 28 with an upper and a lower surfaces 32, 34 of the knife blades 30 each forming a cutting edge 36 in mutual planar alignment. The other said tool side surface 26 has a rasp resting surface 40 extending therefrom for accepting a rasp thereon, and a positioning ledge 60 extending outwardly from the other said tool side surface 26. An elongate rasp 50 is positioned on and abuts the rasp resting surface 40 and extends outwardly therefrom in spaced apart juxtaposition relative to the positioning ledge 60. A clamping means 80 holds the elongate rasp 50 fixedly on the rasp resting surface 40 and provides a handle 90 for manipulation of the tool.

In a second embodiment, shown in FIGS. 5–8 is similar to the first embodiment but provides a tool body 20 having a pair of opposing tool sides 22, 24, each of the tool sides including a tool side surface 26, 28. One said tool side surface 28 provides a pair of spaced apart rasp resting surfaces 40 engaging a pair of elongate rasps 50 separated by a rasp spacer 27 integral with the tool body 20. The other said tool side surface 26 has a rasp resting surface 40 extending therefrom for accepting a rasp 50 thereon, and a positioning ledge 60 extending outwardly from the other said tool side surface 26 in a configuration similar to that of the first embodiment described above. An elongate rasp 50 is positioned on and abuts this rasp resting surface 40 and extends outwardly therefrom in spaced apart juxtaposition relative to the positioning ledge 60. The clamping means 90 holds the elongate rasps 50 fixedly on the rasp resting surfaces 40. A screw or screws 92 are used to fasten the assembly together as shown in the figures.

Generally, the present invention is a hand tool apparatus for sizing and resizing tongue and groove panels and boards. It comprises a tool body providing a pair of opposing tool sides, each of the tool sides including a tool side surface, wherein one tool side surface has a first cutting means, i.e., file, rasp, cutter, abrading device, etc., protruding therefrom, the first cutting means having an upper and a lower cutting surfaces spaced apart for fitting into a groove of a workpiece for resizing the groove by cutting or abrading therein as the first cutting means is drawn along within the groove of the workpiece. The other tool side surface has a second cutting means i.e., file, rasp, cutter, abrading device, extending therefrom and providing a space therein for receiving a tongue of the workpiece for resizing the tongue by cutting thereon as the second cutting means is drawn along about the tongue of the workpiece. The tool preferably has a means for removably fastening the first and second cutting means rigidly to the tool body for enabling the apparatus to be used on the workpiece. Such fastening means is shown in the figures but may be any alternative known to one of skill in the art.

Figure 5:
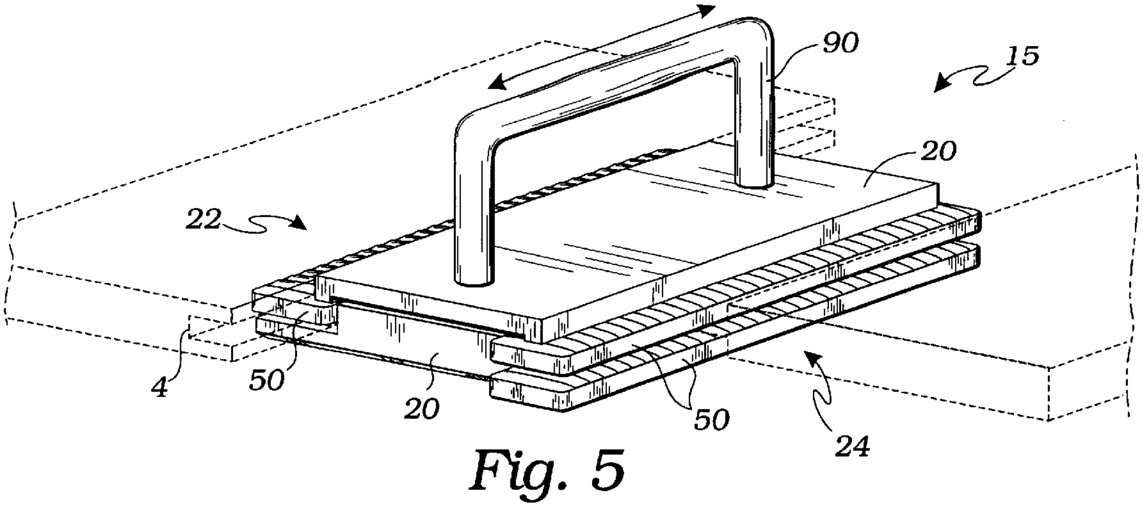
FIG. 5 is a perspective view of a second preferred embodiment of the present invention.
Figure 6:
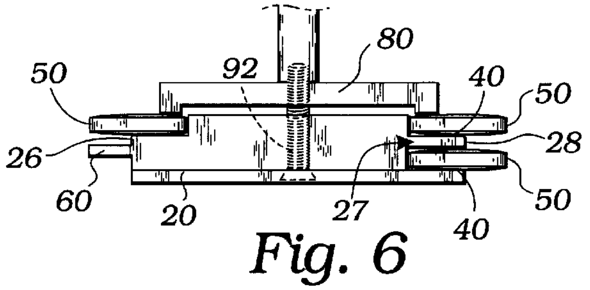
FIG. 6 is a partial end elevational view thereof.
Figure 7:
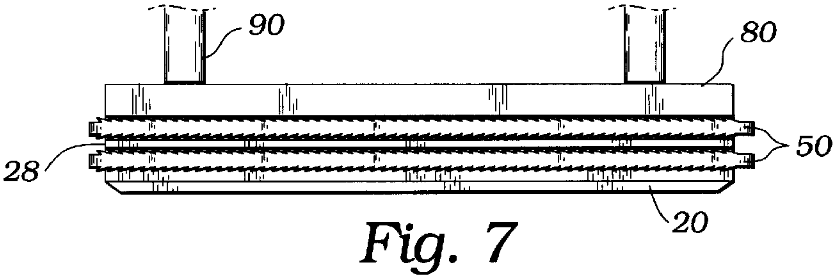
FIG. 7 is a partial right side elevational view thereof.
Figure 8:
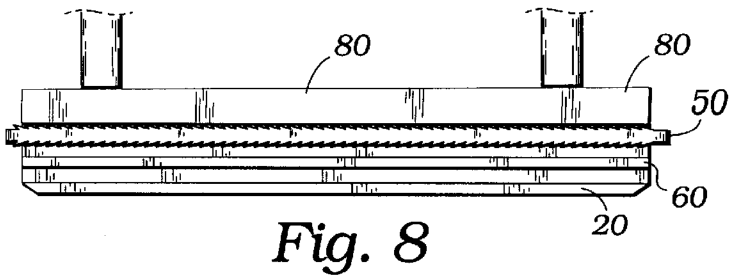
FIG. 8 is a partial left side elevational view thereof

In use, both of the embodiment of the present invention are used to smooth and resize the tongue 3 of a board or plank as shown in FIG. 1, or the groove 4 of a such a workpiece, as shown in FIG. 5. The subject tool is constructed such that the rasp 50 or the blades 30, on the side of the tool used for sizing the groove 4 is of the necessary thickness to control the groove within proper tolerance after the tool has been drawn along the groove. It is also constructed such that the rasps 50 on the side of the tool used for sizing the tongue are spaced apart as necessary to achieve the proper tongue size when the tool is drawn along the tongue. These operations are shown in the figures.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A hand tool apparatus for sizing and resizing tongue and groove panels and boards, the apparatus comprising:

a tool body providing a pair of opposing tool sides, each of the tool sides including a tool side surface;

one said tool side surface having a plurality of integral and spaced apart knife blades protruding therefrom, the knife blades aligned in a row along the one said tool side surface with an upper and a lower surfaces of the knife blades each forming a cutting edge in mutual planar alignment;

the other said tool side surface having a rasp resting surface extending therefrom for accepting a rasp thereon, and a positioning ledge extending outwardly from the other said tool side surface;

an elongate rasp positioned on and abutting the rasp resting surface and extending outwardly therefrom in spaced apart juxtaposition relative to the positioning ledge; and a clamping means holding the elongate rasp fixedly on the rasp resting surface.

2. A hand tool apparatus for sizing and resizing tongue and groove panels and boards, the apparatus comprising:

a tool body providing a pair of opposing tool sides, each of the tool sides including a tool side surface;

one said tool side surface providing a pair of spaced apart rasp resting surfaces engaging a pair of elongate rasps separated by a rasp spacer integral with the tool body;

the other said tool side surface having a rasp resting surface extending therefrom for accepting a rasp thereon, and a positioning ledge extending outwardly from the other said tool side surface;

an elongate rasp positioned on and abutting the rasp resting surface and extending outwardly therefrom in spaced apart juxtaposition relative to the positioning ledge; and a clamping means holding the elongate rasps fixedly on the rasp resting surfaces.

* * * * *